(No Model.)
J. KREHBIEL.
PROCESS OF MAKING GELATINE CAPSULES.
No. 338,754. Patented Mar. 30, 1886.
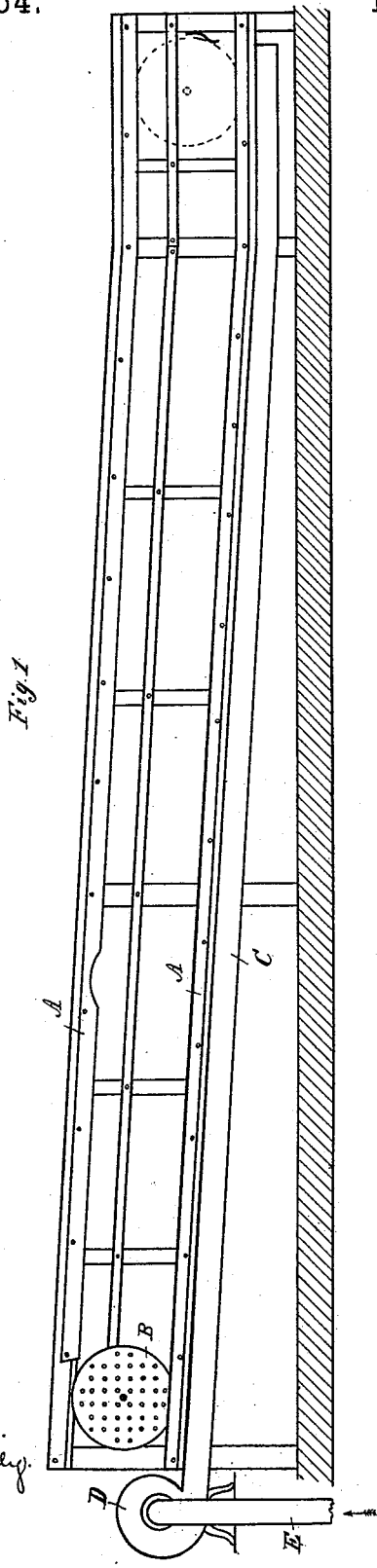
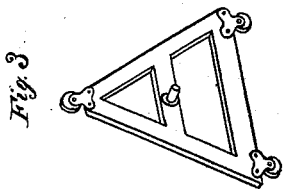
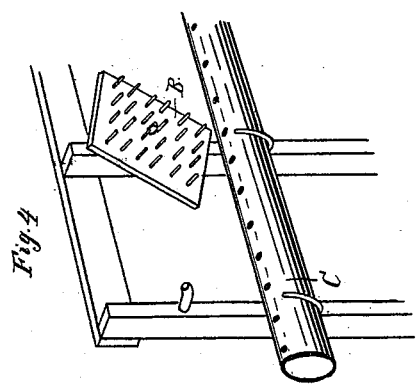
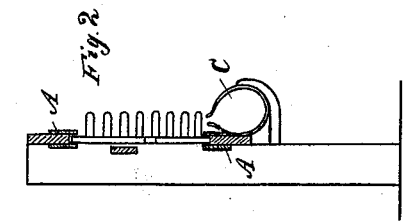
Attest:
John Schuman.
Edmond F. Scully.
Inventor:
John Krehbiel.
by his Att'y
Thos. S. Sprague

UNITED STATES PATENT OFFICE.

JOHN KREHBIEL, OF DETROIT, MICHIGAN, ASSIGNOR TO THE GLOBE DRUG AND CAPSULE COMPANY, OF SAME PLACE.

PROCESS OF MAKING GELATINE CAPSULES.

SPECIFICATION forming part of Letters Patent No. 338,754, dated March 30, 1886.

Application filed September 10, 1885. Serial No. 176,707. (No model.)

*To all whom it may concern:*

Be it known that I, JOHN KREHBIEL, of Detroit, in the county of Wayne and State of Michigan, have invented new and useful Improvements in Processes of Manufacturing Gelatine Capsules; and I do hereby declare that the following is a full, clear, and exact description thereof, reference being had to the accompanying drawings, which form a part of this specification.

The invention relates to a new and useful improvement in the manufacture of gelatine capsules; and it consists in the peculiar use of air-currents for rendering the manufacture of capsules independent of the season or state of the weather, all as more fully hereinafter described.

Heretofore the manufacture of gelatine capsules could not be carried on at all seasons of the year on account of the influence of the state of the atmosphere upon the gelatine. During the cooler seasons of the year it is not difficult to maintain, by means of stoves or other suitable appliances, such a state of heat and dryness in the air of the operating-room as will properly set and harden the gelatine on the mold-pins after the mold-plates are dipped; but during the warm season of the year, when the air in the working-rooms is in the same condition as the outer atmosphere, the case is different. As regards the nature of the gelatine, it must be considered that there are two factors which may produce the setting of the gelatine film on the pins after dipping. First, the gelatine film may be set by chilling it. This may bring the gelatine film in a suitable condition for cutting, and can be easily produced by a a current of cool air. Second, the gelatine film may be set by withdrawing some of its moisture. This must be accomplished by exposing the film to a current of dry air of a certain temperature, for if the latter is too high the gelatine hardens too much in setting and cannot be cut very well. If it is too low, it merely chills the gelatine and leaves it too soft. It is easily understood that in warm and very dry weather the gelatine film (produced upon the mold-pins by dipping them into the hot gelatine solution) will set very quickly and soon become so hard as to make it difficult, if not impossible, for the knives of the cutting-machine to perform their work. On the other hand, if the atmosphere gets highly charged with moisture, as it always does in warm weather during or after a copious rain-storm, the gelatine films on the mold-pins do not set at all, or only insufficiently. The proper operation of the stripping-machine is also dependent on a certain state of hardness of the gelatine film. If the latter is too hard and brittle, it is liable to crack and break off in stripping. If not hard enough, it will easily lose its true shape, and also shrink afterward and become of irregular form and unsuitable for being "capped." Now, if it is considered that the atmosphere in our northern climate is subjected during the summer season to almost daily, and even hourly, fluctuations of heat and moisture, it will be understood why the manufacturers of gelatine capsules have heretofore adhered to the practice of shutting down during the hot summer season.

My invention consists in the use of air-currents of a regulated degree of temperature and moisture to chill and harden the gelatine films on the mold-pins after dipping, so as to obtain the most suitable state of consistency for cutting off the capsules, all as hereinafter described.

In the drawings which accompany this specification, Figure 1 shows an elevation of a runway provided with two parallel inclined guides, A, between which the round plate B is adapted to roll by its own gravity down the incline when inserted at the higher end, as shown in Fig. 1, and in the cross-section in Fig. 2.

Immediately below the runway is secured an air-pipe, C, which extends the whole length of the runway, and is perforated upon its upper side.

D is a blower, by means of which air is driven into the perforated pipe C.

E is the suction-pipe of the blower.

In practice, the higher end of the runway being placed in proximity to the vessel or machine, by means of which the mold-pins are coated with a film of gelatine by the process of dipping, the dipped mold-plates are immediately placed in the runway by the operator. While the mold-plate is thus rolling down, the currents of air discharged through the perforations in the air-pipe pass directly through and around the pins, upon which all the time the gelatine is kept evenly distributed by the rolling of the plate. By the time the mold-plate has arrived at the lower end of the runway the gelatine films on the mold-pins have been sufficiently chilled and hardened to admit of cutting off the capsules, after which the mold-plates are subjected to a more continued exposure of similar air-currents, to harden the capsules sufficiently for stripping. As above explained, it is of the first importance to have these air-currents of a suitable degree of temperature and moisture, and only when the conditions of the atmosphere are found suitable is the blower allowed to draw directly from the outer air. Under unfavorable conditions of the atmosphere I subject the air, before delivering it against the mold-pins, to a proper treatment (such as circulating it through an air-refrigerator, a heater, or a device for moistening it) as the circumstances may require to put it into the desired condition. As devices for accomplishing this object are well known, I do not deem it necessary to describe them here in connection with my improvement. Where the runway is left open to the access of the surrounding air, as shown in the drawings, this air will have still some influence upon the gelatine, and the artificial currents of air have therefore to be regulated to counteract any injurious influence of that air; but it is obvious that the runway may be partially or wholly inclosed and sole dependence placed on the artificial currents of air.

To use the runway for other than round mold-plates, I use a little truck, as shown in perspective view in Fig. 3, and provide the mold-plate with a hole in the center, which allows it to be hung on a pin secured in the center of the truck.

In practice the operator hangs his mold, after dipping, on the peg of the truck, and after giving it a little tap, so as to make it revolve or spin around this peg, lets the truck carry the mold down the runway. My improvement may, however, be carried out without the use of a runway, as shown in Fig. 4, wherein a mold-plate is shown as suspended on a peg which is fixedly secured to a wall or rack in proximity to the dipping-vessel, with the air-pipe arranged to discharge currents of air against and around the mold-pins.

All the mold-plates have to be provided with central holes, so as to allow the operator, after hanging them on a peg, to give them a whirling or spinning motion around the center, which allows the air-currents to play against all the pins and to keep an even film of gelatine on the pins.

In a concurrent application for a patent I have more fully described and claimed the inclined runway and other means for revolving the mold-plates so as to produce an even film of gelatine on the mold-pins, and I confine myself therefore in this application to the herein-described improvement for setting the gelatine on the mold-pins after dipping by means of artificial air-currents.

What I claim as my invention is—

The herein-described improvement in the manufacture of gelatine capsules, consisting in setting the gelatine on the mold-pins after dipping by the use of artificial air-currents of regulated temperature and moisture, substantially as described.

JOHN KREHBIEL.

Witnesses:
H. S. SPRAGUE,
EDMOND J. SCULLY.